UNITED STATES PATENT OFFICE.

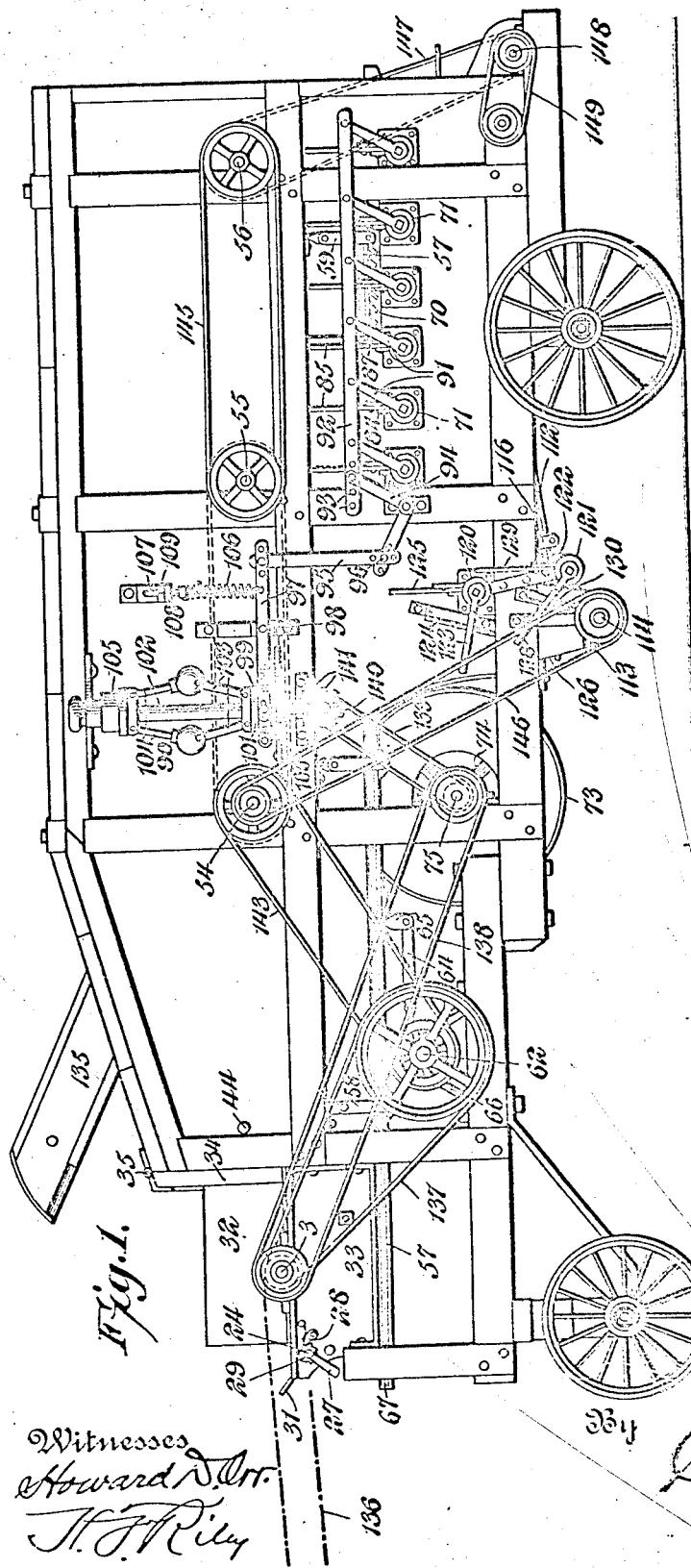

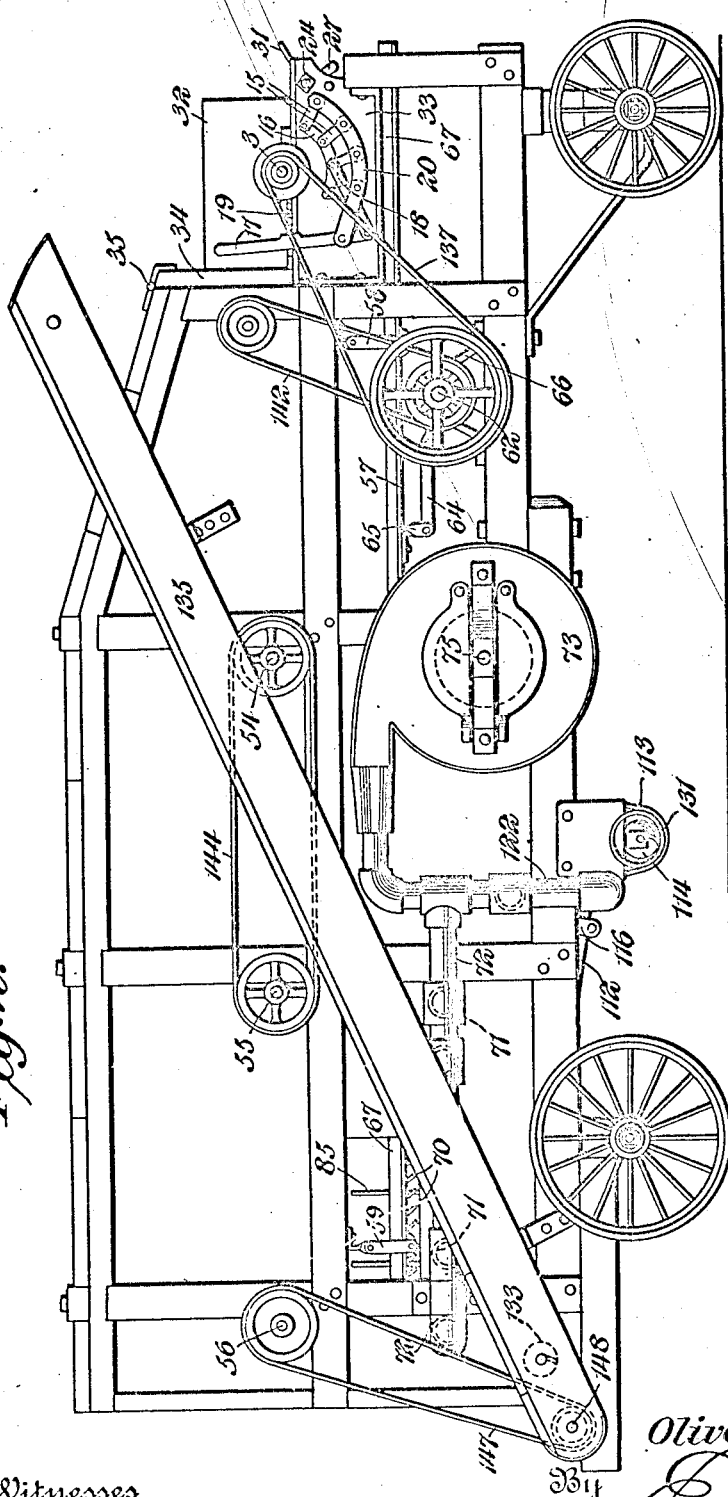

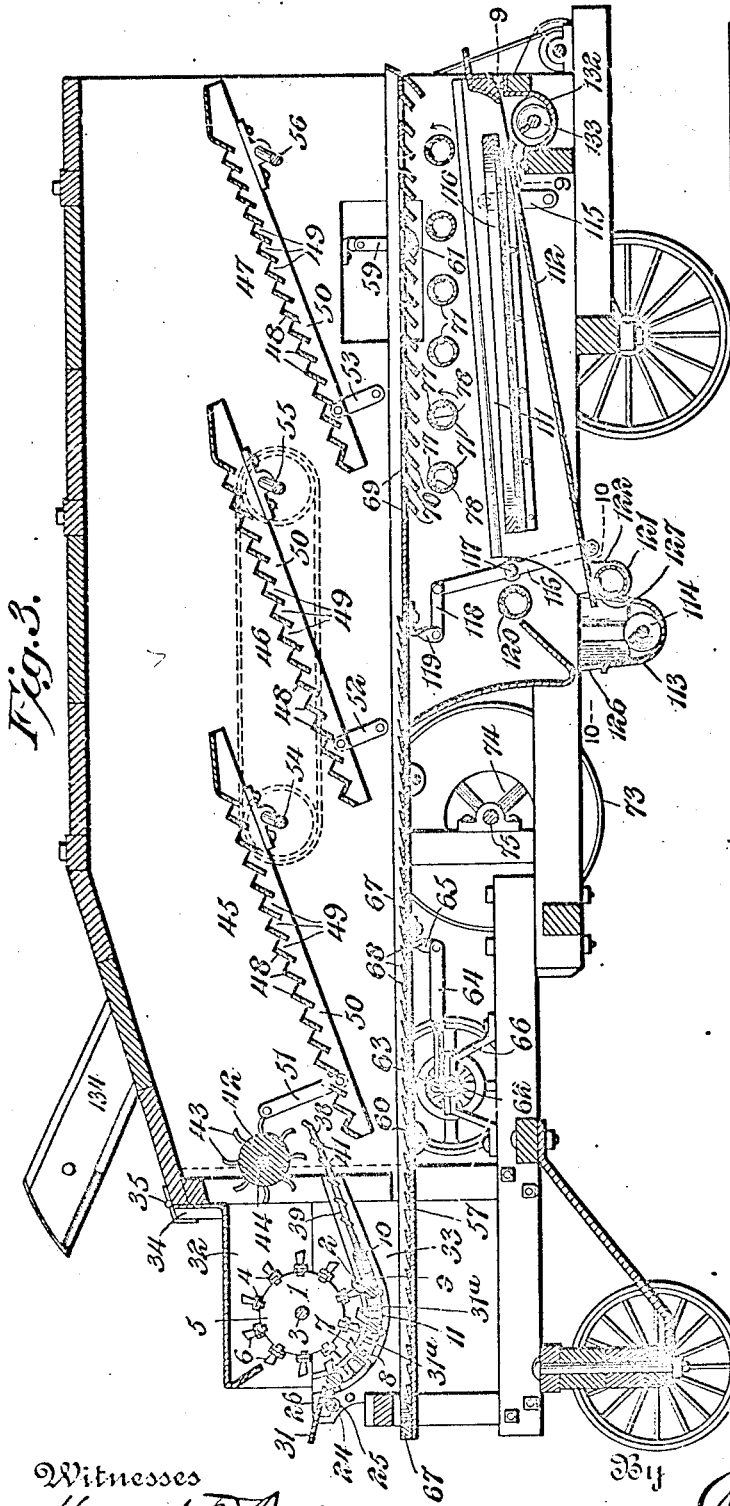

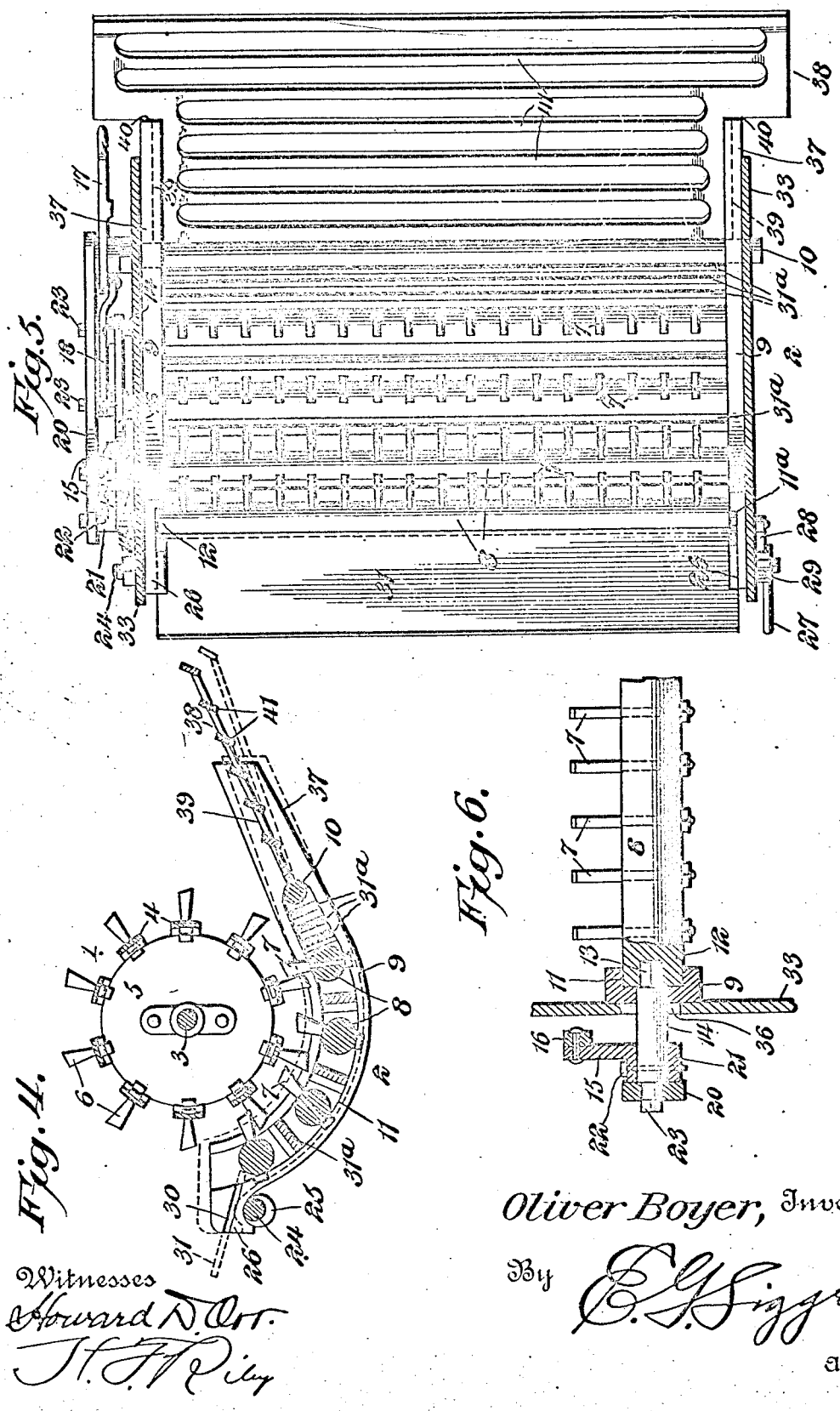

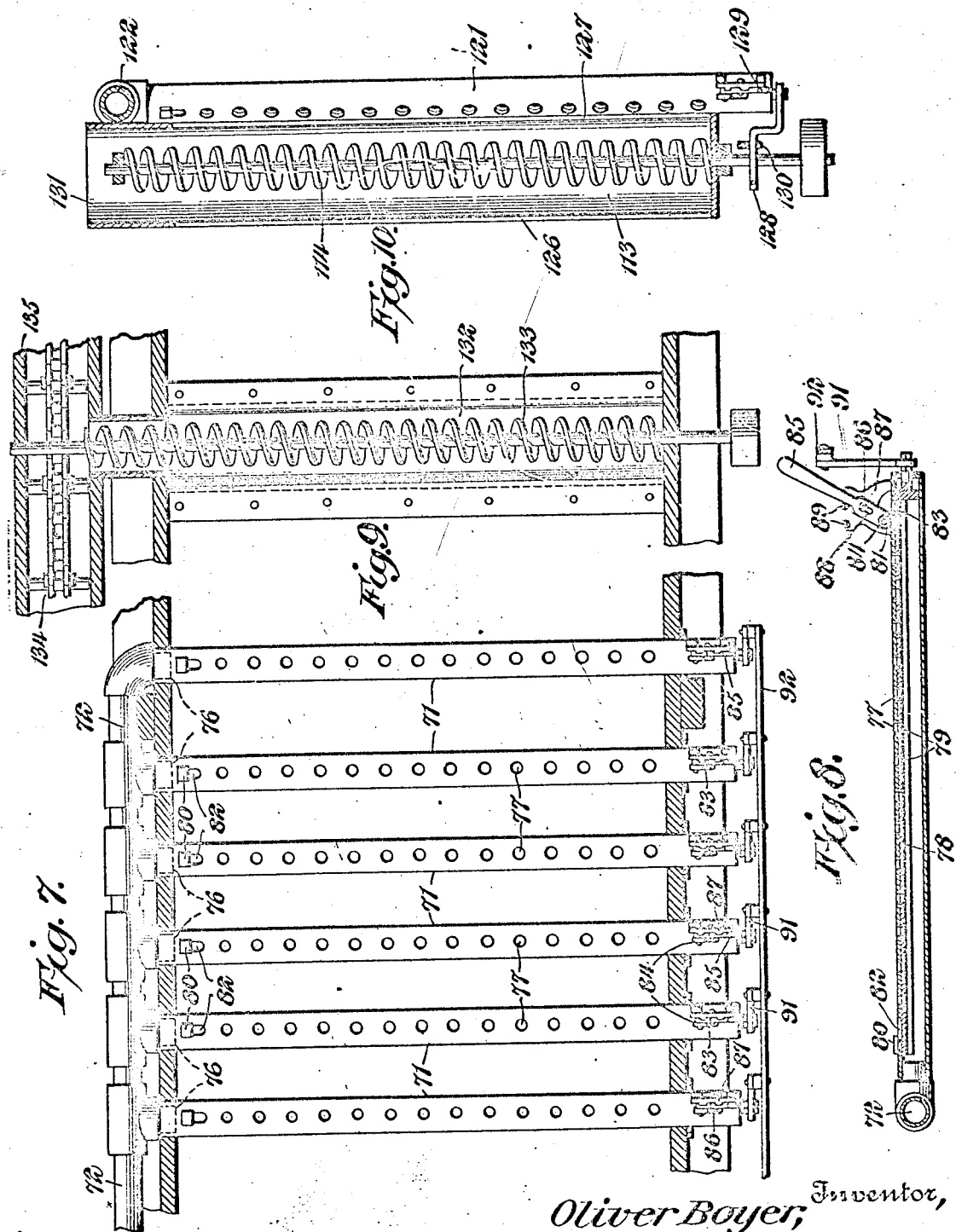

OLIVER BOYER, OF SPENCERVILLE, OHIO.

SELF-REGULATING SEPARATOR.

No. 895,153.     Specification of Letters Patent.     Patented Aug. 4, 1908.

Application filed May 7, 1906. Serial No. 315,631.

*To all whom it may concern:*

Be it known that I, OLIVER BOYER, a citizen of the United States, residing at Spencerville, in the county of Allen and State of Ohio, have invented a new and useful Self-Regulating Separator, of which the following is a specification.

The invention relates to improvements in grain separators.

The object of the present invention is to improve the construction of grain separators, and to provide a simple and comparatively inexpensive separator, having an adjustable concave in which the teeth or spikes may be set at the desired inclination to suit the character of the grain to be threshed, and in which means will be provided for preventing the said teeth or spikes becoming broken should a solid object such as a stone, piece of metal from a binder, or the like get into the separator.

A further object of the invention is to dispense with the cheat screen or the very fine screen, which is usually employed in separators for removing the cheat seed and other wild seed, and which limits the capacity of a separator and results in choking the same at intervals.

A further object of the invention is to provide efficient means for cleaning the grain of fine seed and other impurities, after the grain has been operated on by the riddle, whereby the separator may be continuously operated without liability of becoming clogged.

Furthermore the invention has for its object to provide a separator having air tubes for blowing the chaff from the grain, and provided with manually operable means for varying the size of the air ports or discharge apertures to adapt the blasts to the kind of grain being threshed, and having means for automatically controlling the blasts of air to prevent the grain from being wasted, when the machine is traveling above its normal speed.

With these and other objects in view, the invention consists in the construction and novel combination and arrangement of parts, hereinafter fully described, illustrated in the accompanying drawings, and pointed out in the claims hereto appended; it being understood that various changes in the form, proportion, size and minor details of construction within the scope of the claims, may be resorted to without departing from the spirit or sacrificing any of the advantages of the invention.

In the drawings:—Figure 1 is a side elevation of a grain separator constructed in accordance with this invention. Fig. 2 is a similar view showing the other side of the machine. Fig. 3 is a longitudinal sectional view. Fig. 4 is an enlarged detail vertical sectional view illustrating the construction of the adjustable concave and its arrangement relative to the threshing cylinder. Fig. 5 is an enlarged detail plan view showing the concave and the means for adjusting the shafts or bars thereof. Fig. 6 is an enlarged detail sectional view illustrating the manner of mounting the bars of the adjustable concave and the means for preventing the spikes or teeth from being broken. Fig. 7 is an enlarged detail sectional view illustrating the arrangement of the manually and automatically adjustable air tubes. Fig. 8 is a longitudinal sectional view of one of the air tubes. Fig. 9 is a sectional view taken substantially on the line $x$—$x$ of Fig. 3. Fig. 10 is a similar view taken on the line $y$—$y$ of Fig. 3.

Like numerals of reference designate corresponding parts throughout the several figures of the drawings.

1 designates a skeleton threshing cylinder, located at the front of the frame or casing of the machine and coöperating with a concave 2. The threshing cylinder, which is mounted on a shaft 3, consists of an annular series of spaced bars 4 and supporting heads or disks 5. The bars 4 carry spikes or teeth 6, which coöperate with spikes or teeth 7 of the concave 2.

The spikes or teeth of the concave are relatively fixed, but are adjustable to arrange them at the proper inclination to suit the character of grain to be threshed. The teeth 7 are mounted on a plurality of transverse bars or shafts 8, which extend across the front of the machine and which are supported at their ends by curved bars 9. The curved end bars 9 are pivotally connected at the rear or inner side of the concave to the sides of the frame or casing of the machine by means of a transverse rod 10. The inner opposite faces of the end bars are provided with longitudinal grooves 11, which receive the ends of the rods or shafts 8. The ends 11ᵃ of the rods or shafts 8 are reduced to form journals and are arranged in bearing openings of the contiguous end bar 9. The other ends 12 of the bars or shafts 8 are provided with square sockets to receive the inner ends 13 of a series of short shafts or sections 14, which are journaled in bearing openings of the contiguous end bar 9. The ends 13 of the short shafts or sections 14 are squared to fit the sockets of the ends 12 of the bars or shafts 8, whereby the short shafts or sections 14 are interlocked with the shafts or bars 8. The sockets and reduced inner ends of the short shafts or sections may be of any other polygonal or non-circular shape as will be readily understood. The short shafts or sections 14 are provided with upwardly extending arms 15, which are pivoted at their upper ends to a curved connecting bar 16, and which are adapted to be oscillated to change the angle or inclination of the spikes or teeth 7. This adjustment of the bars 8 is effected by means of an operating lever 17, loosely mounted on the pintle rod 10 and connected by a short rod or bar 18 with one of the arms 15. The lever 17 is fulcrumed at an intermediate point, and its lower arm is connected with the rod or bar 18. When the lever 17 is oscillated, the shafts or bars 8 are rocked and the spikes or teeth are oscillated. The shafts or bars 8 are secured at the desired adjustment by means of a notched bar or ratchet 19, arranged horizontally and adapted to be engaged by the lever. The short shafts or sections 14 are connected at their outer portions by means of a curved bar 20, which is also pivoted at its rear end by the pintle rod 10, and which is adapted to swing upwardly and downwardly with the concave as hereinafter explained.

In order to prevent the spikes or teeth of the concave and the cylinder from being broken by a stone, a piece of metal, or other hard object, the arms 15 are provided at their lower ends with projecting annular flanges or hub portions 21, which are secured to the short shafts or sections 14 by means of pins 22 of less strength than the spikes or teeth. These pins, which may be constructed to stand any desired strain, are adapted to be broken when the spikes or teeth are subjected to excessive strain, whereby the spikes or teeth of the concave are permitted to drop backward to prevent them and the teeth or spikes of the threshing cylinder from being broken. The outer ends 23 of the short shafts or sections are squared to receive a wrench for adjusting the shafts or bars 8 to return the teeth or spikes to their proper position after a breakage of one or more of the pins 22. By this means a new pin may be readily substituted for a broken one.

The concave, which is pivotally mounted, is adapted to be swung upwardly and downwardly to adjust its spikes or teeth for arranging the same in a proper position to suit the kind of grain to be threshed, and this adjustment is effected by means of a shaft 24 journaled in suitable bearings of the frame or casing of the machine at the front end thereof and provided at opposite sides of the same with cams 25, which receive the front ends of the curved end bars 9.

The curved end bars are provided at their front terminals with short extensions 26 having concavedly curved lower edges forming bearing portions for engaging the cams 25. The shaft 24 is adjusted by means of an arm or lever 27, and it is secured in its adjustment by a pawl 28 and a ratchet wheel 29, but any other suitable means may be employed for this purpose. The front extensions 26 of the end bars of the concave are provided with inclined grooves 30 for the reception of a grain board or table 31, which is carried by the concave in its adjustment and which forms a chute for guiding the grain to the threshing mechanism.

The longitudinal grooves of the curved end bars of the concave also receive slats or bars 31ª, located in the space between the shafts or bars and spaced from the latter. These bars, which may be of any desired number, form a grating and permit the grain to fall through the concave.

The threshing mechanism is preferably mounted within a metallic casing composed of upper and lower sections 32 and 33. The upper section 32 is provided at the back with upwardly extending bars or arms 34, which are hinged at the top at 35 to the main frame or casing of the machine. By this construction the upper section 32 may be swung upward to expose the threshing mechanism. The lower section is provided with a curved slot 36, which receives the short shafts or sections 14 and which permits the necessary movement of the same incident to the adjustment of the concave on its pivot.

The end bars 9 are extended upwardly or rearwardly beyond the pivoted rod 10, and these rearward extensions 37 are inclined upwardly and form supports for an inclined screen 38, which is carried by the concave in its adjustment. The inner supporting arms or portions 37 of the bars 9 are provided with longitudinal grooves 39, and the lower portion of the inclined grate 38 is reduced and fitted into the grooves 39, the shoulders 40, formed by reducing the front portion of the inclined screen abutting against the upper ends of the arms or extensions 37 and limiting the downward movement of the grate in the grooves of the arms or extensions 37. The inclined grate 38 is provided with transversely disposed inclined slats or bars 41, which are arranged at intervals to provide intervening spaces to permit any grain shaken from the straw in the upward movement of the same over the screen to fall through the latter. The transverse slats or bars 41, which are set at an angle or inclination, as clearly shown in Fig. 4 of the drawing, are suitably connected at their ends with the sides of the grate and may be formed integral with the same, as indicated in the accompanying drawings.

The straw is moved upward on the inclined grate by the action of the threshing cylinder and by means of a rotary drum or roll 42, located at the upper portion of the inclined screen and provided with projecting fingers 43. The rotary drum or roll is mounted on a shaft 44 and it positively carries the straw rearwardly from the inclined grate and delivers the same to the first of a series of vibratory straw carriers 45, 46 and 47. These straw carriers convey the straw rearwardly, and shake the grain from the same, and in order to permit the grain to be separated from the straw, the said carriers consist of a series of transverse bars or slats 48 set at an angle and spaced apart to provide transverse openings 49. The ends of the transverse bars or slats are suitably secured to longitudinal side bars 50, which have their upper edges recessed or notched to provide inclined seats for supporting the slats or bars 48. The upper side edges of the transverse slots or bars form shoulders for engaging the straw to carry the same forward, and to shake the grain through the intervening openings 49. The inclined vibratory straw carriers have their adjacent ends overlapped so that the straw after passing over the upper end of the carrier will positively fall on the lower portion of the next carrier, and be conveyed rearwardly until discharged at the rear end of the machine.

The front straw carrier 45 is supported at its front portion by means of a pair of links 51, extending upwardly from opposite sides of the straw carrier and pivoted at their upper ends to the frame or casing of the machine at opposite sides thereof. The front portions of the intermediate and rear straw carriers are supported by oscillatory links 52 and 53, located beneath the straw carriers and pivoted to the same and to the sides of the frame or casing of the machine. The rear portions of the straw carriers are mounted on transversely disposed crank shafts 54, 55 and 56 journaled in suitable bearings of the sides of the frame or casing of the machine, and provided with crank loops or bends, which are connected with the straw carriers at the lower face thereof. The straw carrier is provided with suitable bearings to receive the crank loops or bends of the shafts 54, 55 and 56. When the crank shafts are rotated, the straw carrier will be given a vibratory motion, and will be caused to move backward and forward. The straw is conveyed to the rear end of the machine by the rearward movement of the straw carriers, which are moved upwardly simultaneously with such rearward movement. This will cause the upper edges of the transverse slats or bars to engage the straw and carry the same rearwardly. The straw carriers are moved downwardly and forwardly and are adapted to slip beneath the straw, which is fed steadily into the machine by the threshing mechanism, and by the rotary drum or cylinder 42. This vibratory motion of the straw carriers serves to shake the grain from the straw before the latter is discharged at the rear end of the machine. In practice any suitable straw stacker may be connected with the rear end of the separator as will be readily understood.

The grain dropping from the concave, from the front inclined screen 38 and from the straw carriers falls upon a vibratory grain receiving pan or member 57, which is oblong and which extends the entire length of the machine, as clearly shown in Fig. 3 of the drawings. The vibratory grain pan is supported at its front and rear portions by opposite links 58 and 59, arranged in pairs and pivotally connected at their upper ends to the sides of the main frame or casing of the machine by suitable brackets, and connected at their lower ends by transverse rods 60 and 61, which are arranged in suitable bearings of the grain pan. The grain pan is vibrated longitudinally of the machine by means of a crank shaft 62 provided at opposite sides with crank bends 63, which are connected by rods 64 with the grain pan 57. The rods 64 extend rearwardly from the crank shaft, and their rear ends are pivoted to projecting ears or portions 65 of the grain pan. The crank shaft is journaled in suitable bearings of the brackets 66, which are mounted on the lower portion of the frame of the machine at opposite sides thereof.

The shoe, which has a marginal flange or wall 67, is provided with transverse teeth 68, which present inclined front faces and vertical rear shoulders to the grain, so that the grain will be carried rearwardly by the vibration of the grain pan. The toothed or conveyer portion of the grain pan extends rearwardly from the front end thereof to a point in rear of the center of the grain pan, and the rear portion of the latter is provided with transverse openings 69, forming a sieve or screen. The rear portion of the vibratory grain pan 57 is provided at each opening with a depending flange 70, forming a guard and arranged at an inclination and extending downwardly and forwardly from the rear portion of the transverse slot or opening 69. These guards or flanges may be conveniently formed by bending downward the metal cut to form the slots or openings 69.

The transverse slots or openings are of a length less than the width of the grain pan, and the flanges, which extend downward from the lower face of the bottom of the pan, leave the upper face of the same flat, smooth and continuous with the remainder of the pan.

The marginal flange 67, which is arranged at the sides and ends of the vibratory grain pan, is adapted to prevent the grain from falling therefrom, and the chaff is separated from the grain at the rear portion of the grain pan 57 by a plurality of transversely disposed air tubes 71, located beneath the slotted or screen portion of the said grain pan 57 and connected at one side of the machine with an air supply trunk or pipe 72. The air supply trunk or pipe 72, which is arranged horizontally, is connected at its front end by suitable coupling members with the casing 73 of a blast fan 74, which may be of any preferred construction and which is mounted on a transverse shaft 75.

The air tubes 71, which extend across the machine, are journaled in suitable bearings of the same and receive nipples 76 of the coupling members of the air trunk at one end. They are provided at their upper sides with jet apertures 77, arranged at intervals and adapted to be varied in size by means of a suitable plate 78, arranged within each air tube and provided with apertures 79, adapted to register to a greater or less degree with the apertures 77 of the air tubes. The adjustable plate 78 is slidably connected at its ends with the air tubes 71 by means of headed studs 80 and 81, which extend through slots 82 and 83 of the tube. The headed stud 81 is provided with a projecting ear 84, and is pivoted to the lower end of an operating lever 85, which is fulcrumed by a screw 86, or other suitable device on a bracket or piece 87. The lever is provided with a slot 88 to receive the pivot 86, and the bracket or piece, which extends above the fulcrumed point of the lever, is provided with a curved upper edge, having projections or teeth 89 for engaging the lever 85 for securing the same in its adjustment. By adjusting the slidable plate, the jet apertures may be made larger or smaller to suit the grain operated on by the machine.

The air tubes, besides being manually adjustable by the means just explained, are also automatically adjustable by means of a governor 90 to prevent any waste of the grain through any excessive speed of the machine.

The jet openings are normally arranged at an inclination, as illustrated in Fig. 3 of the drawings, to direct the air towards the transverse openings of the rear portion of the grain pan, and when the speed of the machine and the consequent rotation of the blast fan increase beyond a predetermined speed, the air tubes are automatically rotated in the direction of the arrows in Fig. 3, to turn the jet openings more or less away from the transverse slots or openings of the grain pan. This will prevent the air from being thrown directly upon the grain with too great a force and waste of the grain will thereby be avoided.

The air tubes are extended beyond the frame or casing of the machine at one side thereof to receive the operating levers, and the extended ends of the air tubes are also provided with upwardly extending arms 91, which are connected by a horizontal bar 92 for causing the air tubes to be rotated in unison. The front end of the connecting bar 92 is provided with a plurality of perforations 93, and is adjustably connected with one arm of an L-shaped or bell crank lever 94, which is fulcrumed at an angle and which has its other arm adjustably connected with the lower end of a vertical connecting bar 95. The lower end of the connecting bar 95 and the contiguous arm of the lever 94 are provided with a plurality of perforations to receive a pivot bolt 96. The upper end of the connecting bar 95 is adjustably pivoted to one arm of a horizontal lever 97, which is directly operated by the governor 90. The lever 97 is intermediately fulcrumed on a bracket 98, and its front arm is forked and is pivoted to a collar 99, which is arranged in an annular groove 100 of a head 101. The head 101, which is slidably mounted on a vertical governor shaft 102, is connected by lower arms 103 with upper weighted arms 104, which are pivotally connected to a head 105. The head 105 is fixed to the upper portion of the shaft 102, which is journaled in suitable bearings 106$^a$.

The upper arms 104 are preferably in the form of balls and are adapted to be thrown outward by centrifugal force, when the speed of the machine increases beyond a predetermined point to move the slidable head 101 upwardly on the shaft, and thereby oscillate the lever 97. When the lever 97 is oscillated, the air tubes will be partially rotated as before explained. The governor is adjusted by means of a vertically disposed spring 106, which is secured at its lower end to the rear arm of the lever 97 and which is connected at its upper end to an adjustable screw 107. The screw passes through a perforation of a horizontal arm of the bracket 108, and is adjusted by means of a nut 109, which is arranged on the arm of the bracket. By means of the nut and screw, the tension of the spring may be adjusted for maintaining the air tubes in their normal position until the speed of the machine increases beyond a predetermined speed.

The chaff is blown from the grain by the air from the air tubes, and the grain drops upon a shoe or riddle 110 consisting of a screen, and mounted in a vibratory frame or shoe, which is composed of sides 111 and inclined bottom 112 that forms a chute for directing the grain into the casing 113 of a transverse screw conveyer 114. The riddle is vibrated in the usual manner, and its rear end is supported by a pair of links 115, pivoted at their lower ends to the sides of the frame of the machine, and similarly connected at their upper ends to the sides of the frame or shoe. The front portion of the frame or shoe of the riddle is supported by the lower arms of a pair of upwardly extending levers 116, which are fulcrumed at an intermediate point on the sides of the frame of the machine by means of bolts 117, or other suitable fastening devices. The upper arms of the lever 116 are connected by short links 118 with the vibratory grain pan, whereby motion is communicated therefrom to the riddle. The grain pan is provided with depending ears 119 to which the links 118 are connected.

Manually adjustable air tubes 120 and 121 are located respectively at the head of the riddle and at the rear side of the casing 113 of the conveyer. These tubes, which are constructed similar to the tubes 71, are connected at one side of the machine with a downwardly extending arm 122 of the air trunk 72, and are journaled in suitable bearings of the sides of the frame or casing of the machine. The tube 120 is adjusted by means of a lever 123, which is secured in its adjustment by a ratchet 124, arranged at an inclination and adapted to be engaged by the lever 123, as clearly shown in Fig. 1 of the drawings. The lever 123 and the lever 125 for adjusting the jet apertures of the air tube 120 are arranged exteriorly of the frame or casing on an extension of the said tube 120.

The grain is cleaned by the riddle and by the manually adjustable air tube 121, which blows the lighter impurities from the grain, which falls upon the inclined chute or bottom 112 of the shoe or frame of the riddle. The lower end of the inclined chute 112 extends downwardly and forwardly to a point above the transverse conveyer casing 113, which is provided with rear openings 126 and 127, to provide passages for the jets of air from the lower manually operable tube 121. This air tube, which is journaled in suitable bearings of the frame or casing of the machine, is manually rotated by a lever 128, and its jet openings are adjusted by a lever 129. A suitable ratchet 130 is provided for holding the lever 128 in its adjustment.

The cheat and other wild seed are blown from the grain by the air from the tube 121, and this obviates the necessity of providing a cheat screen for effecting this separation or removal of the cheat seed.

The cleaned grain deposited in the transverse conveyer is discharged at one side of the frame from a spout 131.

The tailings and unthreshed heads of wheat or other grain are received within a transverse conveyer casing 132, and are carried by a screw conveyer 133 to an inclined endless conveyer 134, located at one side of the machine and extending upwardly and forwardly from the rear portion thereof, as clearly shown in Fig. 2 of the drawings. The conveyer 134, which is of the usual construction, is provided with a casing 135 and the material discharged from the upper end of the casing 135 is conveyed to the front of the machine by a suitable chute (not shown) to be worked over in the usual manner.

The shaft of the threshing cylinder is provided with a suitable pulley to receive a drive belt 136. Motion is communicated from the shaft of the threshing cylinder to the crank shaft 62 by means of a pair of belts 137, located at opposite sides of the machine and arranged on small pulleys of the threshing cylinder shaft and large pulleys of the crank shaft 62. This gives an even motion to the grain pan and to the riddle, and enables the machine to be effectively run at a high rate of speed. The fan shaft is driven by a belt 138, extending from the threshing cylinder shaft to the fan shaft 75. The governor is connected by a belt 139, which is arranged in a pulley of the fan shaft, and on a pulley of a short horizontal shaft 140, which is connected by beveled ears 141 with the lower end of the governor shaft 102.

The rotary drum or cylinder 42 is driven from the crank shaft 62 by a belt 142, located at one side of the machine and the crank shaft 54 of the front straw conveyer is driven from the said crank shaft 62 by means of a belt 143 located at opposite sides of the machine. The intermediate and rear straw conveyers 46 and 47 are operated by belts 144 and 145, located at opposite sides of the machine and arranged on pulleys, which are fixed to the crank shafts 54, 55 and 56. The grain conveyer is driven from the crank shaft 54 by a belt 146 and the endless conveyer 134 is driven by a belt 147 extending from the rear crank shaft 56 to the lower shaft 148 of the conveyer 134. The shaft 148 extends entirely across the machine, and motion is communicated therefrom to the conveyer 133 by a short belt 149.

It will be seen that the separator is exceedingly simple and comparatively inexpensive in construction, and that it is adapted to be run at a high rate of speed without danger of clogging, as the cheat and similar wild seed is blown from the grain instead of the screen. As it will be clear that means are provided throughout the entire length of the machine for permitting any grain carried by the straw to drop therefrom onto the grain pan, and that the grain at the rear portion of the grain pan is thoroughly subjected to the action of the air throughout the entire width of the pan and for sufficient distance along the same to thoroughly remove the chaff from the grain.

Furthermore it will be apparent that the machine is self regulating in that when traveling at an excessive rate of speed, the jet openings will be turned away from the openings of the grain pan to a greater or less degree to prevent waste of the grain.

Having thus fully described my invention, what I claim as new and desire to secure by Letters Patent, is:—

1. In a machine of the class described, the combination with a threshing cylinder, of a casing provided with shafts having spikes or teeth, means for connecting the shafts for causing the same to turn in unison, and means connected with the said means for operating the shafts to adjust the spikes or teeth.

2. In a machine of the class described, the combination with a frame, and a threshing cylinder, of a concave pivoted at one side and provided with shafts having spikes or teeth, means located at the opposite side of the concave for moving the same bodily towards the cylinder, and separate means for simultaneously rotating the shafts, the latter means including arms rigid with the shafts, a connecting bar pivoted to the arms, a lever fulcrumed on the frame, and a link pivoted to the lever and to the connecting bar, said link being arranged to permit the concave to be moved toward and from the cylinder by the first mentioned means.

3. In a machine of the class described, the combination with a threshing cylinder, of a concave having shafts carrying spikes or teeth, short shafts detachably interlocked with the said shafts, means for connecting the short shafts for causing the same to turn in unison, and means connected with the said means for operating the shafts to adjust the spikes or teeth.

4. In a machine of the class described, the combination with a threshing cylinder, of a concave having shafts carrying spikes or teeth, short end shafts detachably interlocked with the said shafts and rigid with the same, arms mounted on the short shafts, and operating mechanism connected with the arms for turning the said shafts in unison to adjust the spikes or teeth.

5. In a machine of the class described, the combination with a threshing cylinder, of a concave having shafts carrying teeth and provided with sockets, short shafts fitted in the sockets and detachably interlocked with the said shafts, arms mounted on the short shafts, and means for adjusting the arms to turn the shafts in unison.

6. In a machine of the class described, the combination with a threshing cylinder, of a concave provided with pivoted bars or shafts carrying spikes or teeth, arms rigid with the bars or shafts, a bar connecting the arms, a lever connected with one of the arms for simultaneously turning the shafts, and means for securing the lever in its adjustment.

7. In a machine of the class described, the combination with a threshing cylinder, of a concave having pivoted bars or shafts carrying spikes or teeth, short shafts or sections interlocked with the said shafts or bars, arms arranged on the short shafts or sections and having breakable pins for engaging the same, means for connecting the arms, and an adjusting device connected with the arms.

8. In a machine of the class described, the combination with a threshing cylinder, of a concave having bars or shafts carrying teeth and provided with sockets, short shafts or sections fitting in the sockets and interlocked with the shafts or bars, said short shafts or sections having polygonal wrench receiving outer ends, arms mounted on the short shafts or sections and having breakable means for connecting them with the same, and an adjusting device connected with the arms for partially rotating the shafts or bars.

9. In a machine of the class described, the combination with threshing mechanism, and a straw carrier, of a vibratory grain pan located beneath the threshing mechanism and the straw carrier and provided with means for conveying the grain rearwardly and having transverse openings of a length less than the width of the grain pan, said grain pan being also provided with flanges located at the said openings and depending from the bottom of the pan leaving the top thereof flat, smooth and continuous with the remaining portion of the pan.

10. In a machine of the class described, the combination with threshing mechanism including a grain pan having openings, of a plurality of air tubes having jet openings and located beneath the grain pan, and a governor connected with and operated by the threshing mechanism for automatically adjusting the air tubes for changing the direction of the air jets to accord with the speed of the threshing mechanism.

11. In a machine of the class described, the combination with a frame, of a stationary exteriorly arranged air supply pipe or trunk located along one side of the frame and provided with nipples, which enter the side of the frame, transverse air tubes arranged within the machine and having jet openings, said tubes being supported at one end by the said nipples which form journals, the other end of the air tubes passing through the opposite side of the frame and being journaled in bearings provided therein and projecting therefrom, and means located at the outside of the machine and connected with the projecting ends of the air tubes for partially rotating the latter on the journals to change the direction of the air jets without varying the size of the same.

12. In a machine of the class described, the combination with a frame, of a stationary exteriorly arranged air supply pipe or trunk located along one side of the frame and provided with nipples, which enter the side of the frame, transverse air tubes arranged within the machine and having jet openings, said tubes being supported at one end by the said nipples which form journals, the other end of the air tubes passing through the opposite side of the frame and being journaled in bearings provided therein, means located at the outside of the machine for partially rotating the tubes on the journals to change the direction of the air jets without varying the size of the same, and means mounted on and carried by the air tubes in their rotary movement to adjust the size or close the openings, the latter means being operable independently of the rotating means.

13. In a machine of the class described, the combination of a frame, a grain-pan, an exteriorly arranged air supply pipe or trunk provided at intervals with nipples extending inwardly and forming journals, transverse air tubes provided with jet openings and extending across the frame within the machine, said air tubes being supported at one end by the said journals and having their other ends journaled in bearings at the opposite side of the frame, adjusting mechanism connected with the latter ends of the transverse air tubes for partially turning the same to change the direction of the air jets and vary the force of the same with respect to the material operated on, and a governor connected with the said adjusting means for automatically adjusting the transverse air tubes with respect to the speed of the machine.

14. In a machine of the class described, the combination with a grain-pan, of air tubes having jet openings and mounted for rotary movement within the machine, a governor for automatically changing the direction of the air jets to vary the force of the same with respect to the material operated on and the speed of the machine, and manually adjustable means for connecting the air tubes with the governor for adjusting the former with respect to the latter.

15. In a machine of the class described, the combination with a grain pan, of a plurality of air tubes located beneath the grain pan and having jet openings, said tubes being adjustable to change the direction of the air jets, and a governor connected with the air tubes for automatically adjusting the same.

16. In a machine of the class described, the combination of a grain-pan having openings and provided with depending inclined flanges forming guards, air tubes adjustably mounted beneath the grain-pan and having jet openings, and means for partially rotating the air tubes automatically for changing the direction of the air jets to vary the force of the same with respect to the material operated on.

17. In a machine of the class described, the combination of a grain pan, of a plurality of air tubes mounted for rotary adjustment and provided with arms, a bar connecting the arms, a lever connected with the bar for moving the same, and a governor for automatically actuating the lever.

18. In a machine of the class described, the combination with threshing mechanism including a grain pan, of a plurality of air tubes provided with jet openings and adjustable to change the direction of the air jets, a governor connected with and operated by the threshing mechanism, a lever connected with the air tubes and actuated by the governor for automatically adjusting the said air tubes, and a tension device connected with the lever.

19. In a machine of the class described, the combination of a grain pan having a perforated section at the rear end, spaced air tubes located beneath the perforated section of the grain pan, said tubes being perforated in their upper portions, means for vibrating the grain pan, a chute located below the air tubes, a riddle interposed between the chute and the air tubes, means for shaking the riddle, and a transverse air tube located at the head of the riddle.

20. In a machine of the class described, the combination with a grain pan, of a plurality of air tubes located beneath the grain pan, an inclined chute arranged beneath the air tubes, a riddle located between the air tubes and the chute, a transverse conveyer arranged to receive the material from the chute and provided with a casing having apertures adjacent to the lower ends of the chute, and a transverse air tube having jet openings arranged to discharge through the said apertures.

21. In a machine of the class described, the combination with an inclined chute, of a transverse conveyer arranged at the lower end of the chute having a casing and provided at opposite sides with openings, and a transverse air tube located at the lower end of the chute adjacent to the casing of the conveyer and provided with jet openings arranged to discharge the air through the opposite opening of the conveyer casing.

22. In a machine of the class described, the combination of threshing mechanism, gearing for operating the same, an air tube having jet openings and arranged within the machine, and means connected with the gearing and operated by the same for automatically changing the direction of the air jets to accord with the speed of the threshing mechanism.

23. In a machine of the class described, the combination of threshing mechanism including a grain pan, gearing for operating the same, an air tube arranged within the machine and having a limited rotary movement and provided with jet openings, and means for connecting the air tube with the gearing for automatically changing the direction of the air jets to accord with the speed of the machine.

24. In a machine of the class described, the combination of threshing mechanism, including a grain pan, gearing for operating the same, a plurality of air tubes having jet openings and arranged within the machine, said tubes having a limited rotary movement, means for connecting the tubes together to cause them to move in unison, and means connected with the gearing and operated by the same for automatically adjusting the air tubes to change the direction of the air jets to accord with the speed of the machine.

25. In a machine of the class described, the combination with separating mechanism including a cylinder, concave and straw carriers, of a grain pan extending from the front to the rear of the machine and arranged beneath the cylinder, concave and straw carriers throughout the entire separating mechanism, the rear portion of the pan being perforated, means for vibrating the grain pan, a riddle located below the grain pan at the rear end of the machine, means for shaking the riddle, a plurality of air tubes arranged below the rear portion of the grain pan and above the riddle and having perforations at their upper portions, and means for forcing a blast of air through the air tubes.

In testimony, that I claim the foregoing as my own, I have hereto affixed my signature in the presence of two witnesses.

OLIVER BOYER.

Witnesses:
 IRA B. BEST,
 P. F. SISLER.